March 1, 1949.   J. F. CAMPBELL   2,463,151
MICROMETER BENCH GAUGE
Filed July 31, 1947   3 Sheets-Sheet 1
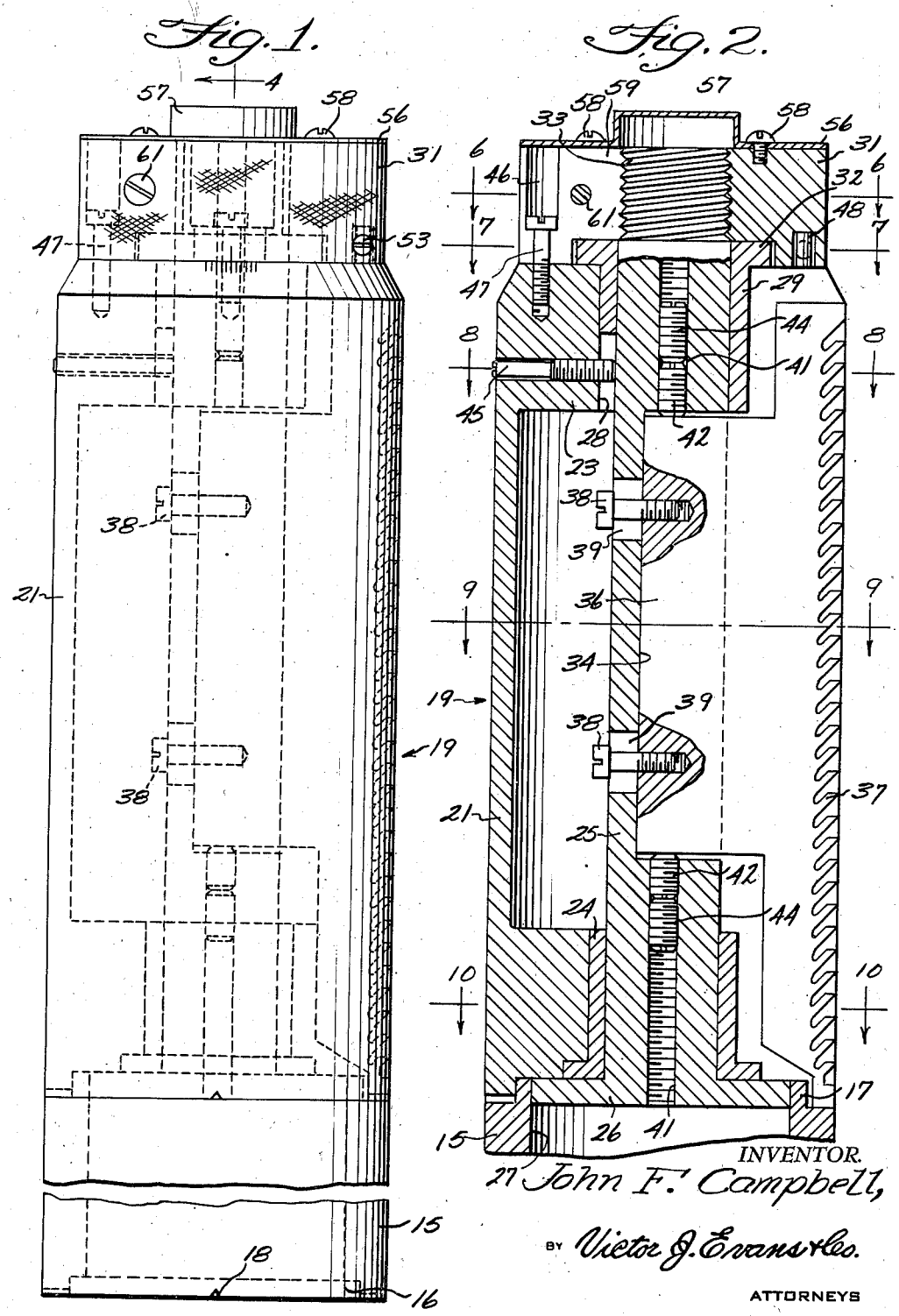
INVENTOR.
John F. Campbell,
BY Victor J. Evans & Co.
ATTORNEYS

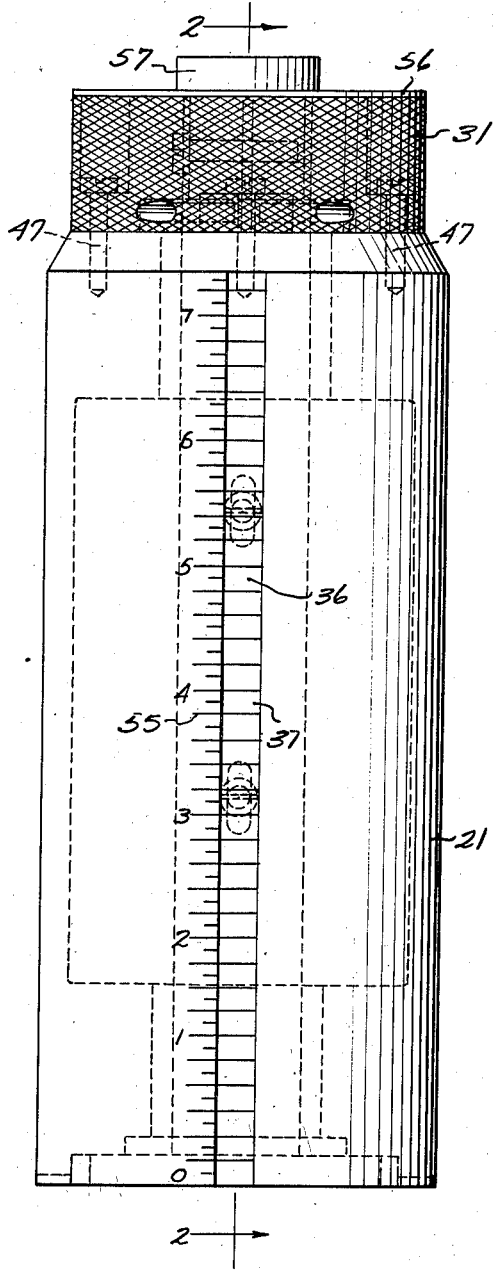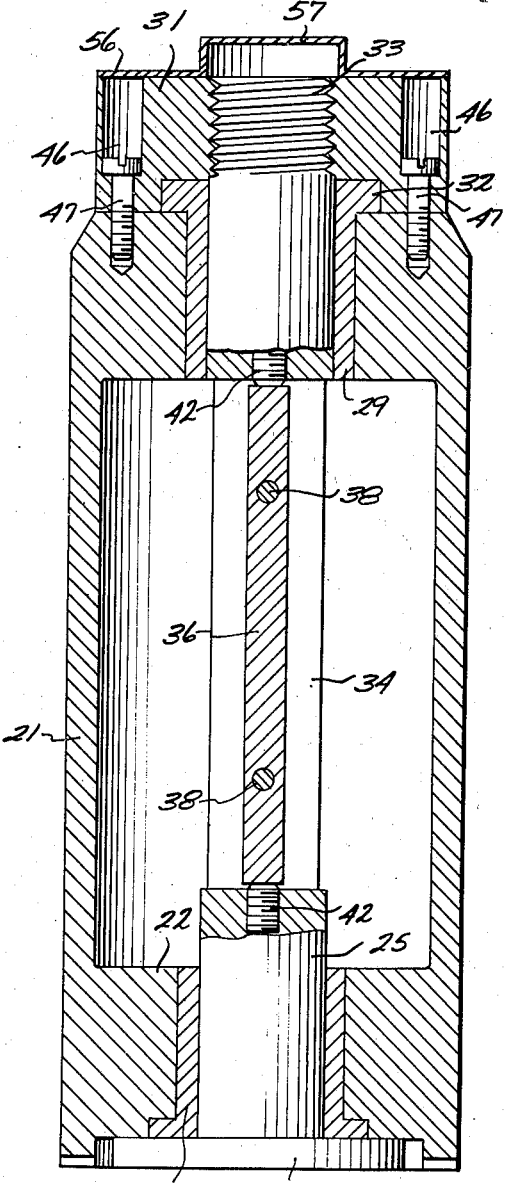

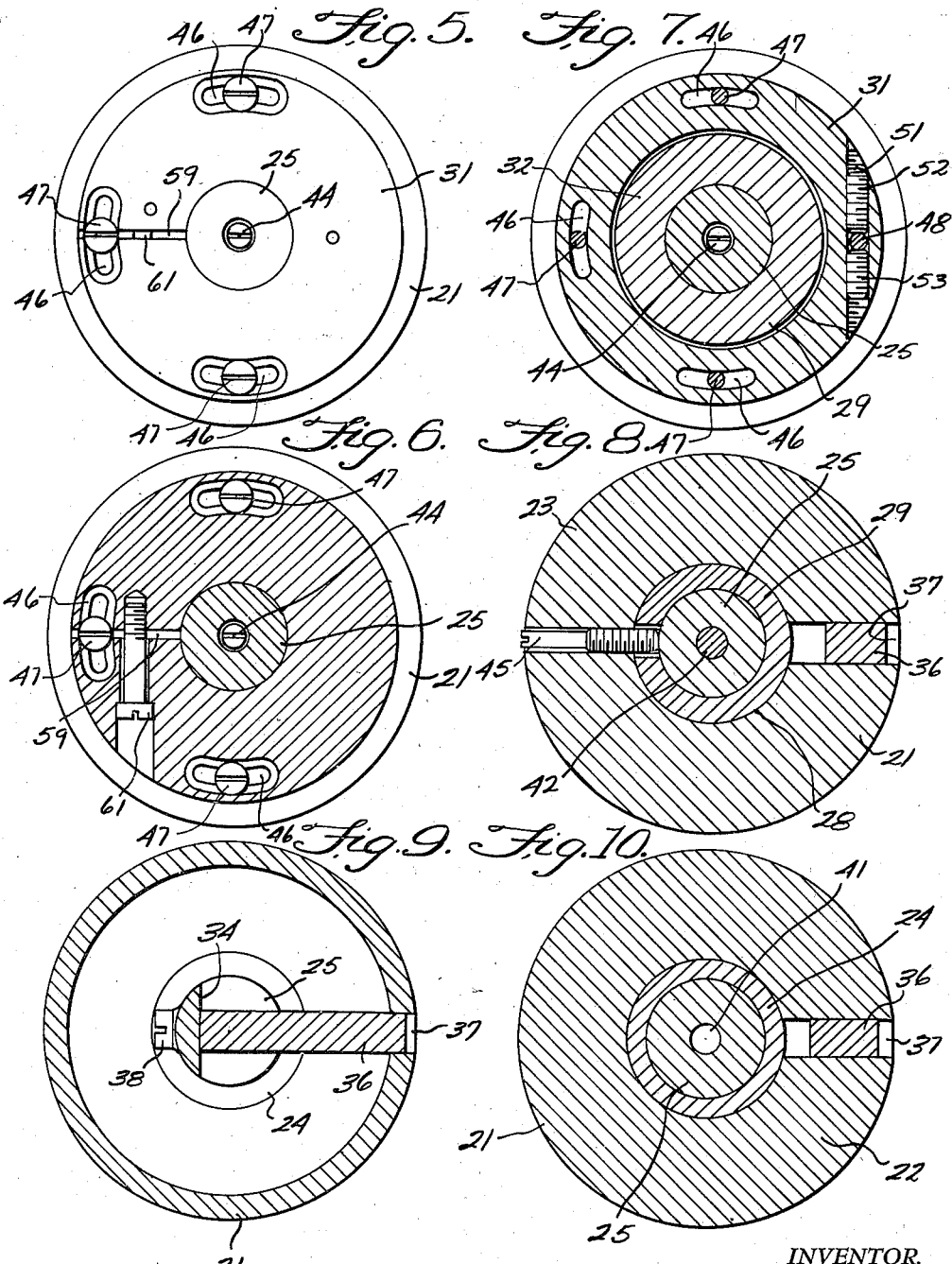

Patented Mar. 1, 1949

2,463,151

UNITED STATES PATENT OFFICE 2,463,151

MICROMETER BENCH GAUGE

John F. Campbell, Williamsport, Pa.

Application July 31, 1947, Serial No. 765,193

4 Claims. (Cl. 33—170)

This invention relates to measuring gauges for bench work.

It is an object of the present invention to provide a measuring gauge for checking tool jigs or production parts from a flat surface of a bench with which a dial gauge can be referred to to take off exact measurements for determining the exact measurement upon the jig or production part.

It is another object of the present invention to provide a work bench gauge which can be adjusted in a mircometer fashion and wherein after the adjustment has been effected adequate means is provided whereby to hold the adjusted parts in their fixed positions so as to provide a rigid and fixed mass of the adjustable parts so that there is little opportunity for the same to become moved or placed out of adjustment once the setting has been made.

It is another object of the present invention to provide a micrometer measurement gauge wherein two turns of the adjusting member having an indicating mark thereon and registering with a scale, is necessary to effect one unit measurement on the scale from which the measurements are taken.

Other objects of the present invention are to provide a micrometer bench gauge which can be adapted for use on gauge parts of known height and can be used in any number depending upon the height of the work to be measured, and a micrometer measurement gauge which will consume little space, easy to handle and efficient in operation.

For other objects and for a better understanding of the invention, reference may be had to the following detailed description taken in connection with the accompanying drawing, in which Fig. 1 is a side elevational view of my micrometer measuring gauge for bench work.

Fig. 2 is a cross-sectional view, in elevation, taken on line 2—2 of Fig. 3.

Fig. 3 is a front elevational view of my gauge looking upon the front thereof.

Fig. 4 is a cross-sectional view, in elevation, taken on line 4—4 of Fig. 1.

Fig. 5 is a top plan view of the gauge looking upon the adjusting member with the top cap removed.

Figs. 6, 7, 8, 9 and 10 are respectively transverse cross-sectional views taken on lines 6—6, 7—7, 8—8, 9—9 and 10—10 of Fig. 2 and looking in the direction of the arrows thereof.

Referring now to the figures, 15 represents a block of which there may be any number and which has a recess 16 in one end and a projection 17 at the other end whereby these blocks can be stacked one upon the other and retained against lateral displacement relative to each other. These blocks are of known height and of accurate dimension. The top and bottom faces of the block are carefully formed to be smooth and the bottom face may have a notch 18 therein adapted to collect any small particles of dirt on the bench surface as the measuring gauge is slid thereover.

On these blocks 15 there may be mounted my adjustable gauge element which may be indicated generally at 19. This element comprises a hollow member 21 having a lower radially inwardly extending portion 22 and another radially inwardly extending portion 23. Fitted in the lower portion 22 is a bearing sleeve 24 through which a central member 25 may be adjusted. This member 25 has a flange 26 adapted to fit an opening 27 of a block 15 whereby to make a flush engagement with the same and to retain the measuring device 19 against displacement from the block 15. The portion 23 has a central opening 28 in which is a sleeve 29 through which the central member 25 extends.

On the top of the portion 23 there rests an adjusting nut 31 which fits over a flange 32 on the sleeve 29 and which is adjustable on a threaded portion 33 of the central member 25. As the adjusting nut 31 is turned, the central member 25 will be vertically adjusted.

The central member 25 has a slot 34 extending partly throughout the length of the same and adapted to receive the inner side of a scale 36. This scale 36 has a series of projections 37 thereon from which measurements are taken. These projections are two hundred one-thousandths of an inch apart. The scale 36 is fixed within the opening 34 and to the member 25 by screws 38 extending through elongated slots 39 in the member 25. With these screws tightened, the member will be retained within the opening 34.

Within the member 25 are threaded bores 41 at the opposite ends of the same in which can be adjusted small screws 42. When the screws 38 are loosened, an adjustment can be effected by the screws 42, thereafter a locking screw 44 can be adjusted in the threaded bore 41 whereby to lock the screw 42.

With the scale 36 fixed to the member 25, the member 25 and the scale can be adjusted by the nut 31 to the proper zero setting of the gauge. Thereafter several screws are made fast between the parts so as to positively and rigidly lock all of the parts together so that there is little chance of the same becoming released from one another and the setting being spoiled.

The adjustment is effected by the nut 31 and two revolutions of the nut will effect an adjustment equal to the spacing between the projections 37. With the setting once made a set screw 45 is fixed between the portion 23 and the member 25.

Within the nut 31 is a plurality of arcuate shaped openings 46 located ninety degrees apart into which there is extended locking screw 47 adapted to enter the portion 23. With a small adjustment of the nut 31, the screws 47 can be left in place.

To effect a small adjustment of the nut without removing the screws 47 and to positively lock the nut against rotation in addition to the locking of the same by the screws 47, there is provided a projection 48 which extends upwardly from the top of the portion 23 into an opening 51 in the nut 31. The opening 51 extends in a transverse plane and contains adjusting screws 52 and 53 located respectively on opposite sides of the projection 48. By loosening one screw and tightening the other, the nut 31 will be adjusted.

Scale indications 55 are disposed on the front of the member 21. A cap 56 having a central projection 57 into which threaded portion 33 of member 25 can be extended, is fixed to the top of the nut 31 by screws 58. By this cap, access to the arcuate openings 46 is prevented.

To further tighten the nut 31 on the threaded portion 33 of the member 25, there is provided a slit 59 in the nut 31 and a tightening screw 61 which will serve to tighten the nut 31 upon the threaded portion 33. The measuring scale 36 extends through a slot 62 in the member 21.

While various changes may be made in the detail construction, it shall be understood that such changes shall be within the spirit and scope of the present invention as defined by the appended claims.

I claim:

1. A measurement gauge for bench work comprising a hollow member having a central opening therethrough, a central member axially adjustable through the central opening of the hollow member and having a threaded upper end, said first mentioned member having a radially extending slot, said central member having a radially extending opening, a scale and means for connecting the same to the central member within the opening thereof and adjustable with the central member within the opening and slot of the first mentioned member, an adjusting nut threadedly connected with the threaded upper end of the central member and engaging with the hollow member whereby to adjust the same with the scale axially along the first mentioned member and within the opening thereof, means for securing the adjusting nut to the first mentioned member and means for securing the first mentioned member to the central member.

2. A measurement gauge for bench work as defined in claim 1 and said central member having a threaded bore extending into each of the opposite ends of the same and into the radially-extending opening thereof for engagement with the scale member disposed therein, said means for connecting the scale to the central member comprising fastening screws entering the scale and said central member having elongated slots for receiving the fastening screws, adjusting screws within the threaded central bore of the central member for effecting a minute adjustment of the scale, said adjusting screws engaging with the opposite upper and lower ends of the scale, and locking screws within the threaded central bore of the central member for fixing the adjusting screws therein.

3. A measurement gauge for bench work as defined in claim 1, and said adjusting nut having arcuate shaped openings therein circumferentially spaced from one another, fastening screws extending into the openings for fixing the adjusting nut to the first mentioned member, said first mentioned member having a projection extending upwardly into the adjusting nut, said adjusting nut having an opening for receiving the upwardly extending projection of the first mentioned member, and laterally extending adjusting screws in opposed alignment threaded in the adjusting nut and extending into the projection-receiving opening of the adjusting nut and engaging with the projection whereby to adjust and lock the adjusting nut against angular displacement relative to the first mentioned member.

4. A measurement gauge as defined in claim 1, and said adjusting nut having a slit at one side thereof, and a fastening screw threadedly connected with and extending through the nut between the opposite sides of the slit whereby to effect locking engagement of the nut with the threaded upper end of the central member.

JOHN F. CAMPBELL.

REFERENCES CITED

The following references are of record in the file of this patent:

UNITED STATES PATENTS

| Number | Name | Date |
|---|---|---|
| 2,135,316 | Whistler et al. | Nov. 1, 1938 |
| 2,440,710 | Bauer | May 4, 1948 |